United States Patent [19]

Berger et al.

[11] Patent Number: 4,567,559

[45] Date of Patent: Jan. 28, 1986

[54] APPARATUS FOR REGULATING A PARAMETER BY ADMITTING AN ADDITIVE INTO A MEDIUM

[75] Inventors: Hermann Berger; Franz Ernst, both of Heidelberg, Fed. Rep. of Germany

[73] Assignee: Chemie Und Filter GmbH Verfahrenstechnik KG, Heidelberg, Fed. Rep. of Germany

[21] Appl. No.: 500,267

[22] Filed: Jun. 2, 1983

[30] Foreign Application Priority Data

Jun. 5, 1982 [DE] Fed. Rep. of Germany ....... 3221365

[51] Int. Cl.$^4$ ...................... G05B 15/02; G05B 19/29; G01N 15/00
[52] U.S. Cl. .................................. 364/183; 364/509; 318/600; 318/603; 318/609; 73/61.1 R
[58] Field of Search ............... 364/183, 556, 506, 509, 364/569; 73/61.1 R; 251/131; 318/596, 600, 603, 609

[56] References Cited

U.S. PATENT DOCUMENTS

| | | | |
|---|---|---|---|
| 3,189,805 | 6/1965 | Poepsel et al. | 364/183 X |
| 3,439,336 | 4/1969 | Toifl et al. | 364/183 X |
| 3,745,560 | 7/1973 | Tripp | 318/603 X |
| 3,836,833 | 9/1974 | Harris et al. | 318/603 X |
| 3,914,581 | 10/1975 | Gilson | 364/183 X |
| 4,203,061 | 5/1980 | Minakuchi | 318/490 |
| 4,366,534 | 12/1982 | Kompelein | 364/183 |
| 4,371,940 | 2/1983 | Yamaki et al. | 364/569 X |
| 4,417,312 | 11/1983 | Cronin et al. | 364/183 X |

Primary Examiner—Jerry Smith
Assistant Examiner—Jon D. Grossman
Attorney, Agent, or Firm—Peter K. Kontler

[57] ABSTRACT

An apparatus for regulating a parameter by admission of an additive into a medium comprises a control pulse generator which is dependent on the extent of deviation from the norm, and a regulating element which effects the admission of additive during the interval of generation of a control signal. The control signal generator comprises a first timing pulse generator with a constant frequency and a first counter which receives the first timing pulses from the first timing pulse generator and transmits a first counter overflow signal after receiving a predetermined number of first timing pulses. The control signal generator further comprises a second timing pulse generator whose frequency increases with decreasing deviation form the norm and which transmits second timing pulses to a second counter which transmits a second counter overflow signal after receiving a predetermined number of second timing pulses. Still further, the control signal generator comprises a circuit which interlinks the first and second counter overflow signals in such a way that the first counter determines the duration of the periods and the second counter determines the width of the control signals.

9 Claims, 3 Drawing Figures

APPARATUS FOR REGULATING A PARAMETER BY ADMITTING AN ADDITIVE INTO A MEDIUM

BACKGROUND OF THE INVENTION

The invention relates to an apparatus for regulating a parameter, such as a pH value of a medium, by admitting an additive into a medium, with a control signal generator which is dependent upon the departure from norm of the medium and with a regulating element which effects the admission of additive for the duration of the control signal.

In a conventional apparatus of such character (refer to German Pat. No. 2,641,101), control signals are obtained by use of a timing capacitor which is charged by way of a resistor in dependency on the extent of deviation from the norm and is discharged by way of a threshold value switch. The discharge impulses control a timer which transmits control signals of constant width but of variable frequency. An electromagnetically operated metering pump receives rectified alternating current voltage for the duration of each control signal. The metered quantity which is delivered per unit of time decreases with decreasing deviation from the norm.

In such a regulating device, the frequency of control signals can be varied between 10 and 100 signals per minute. Thus, the metered quantities can be regulated at a ratio of 1:10. The minimum duration of a period is approximately six seconds and the maximum signal width is approximately 0.6 seconds. This necessitates the carrying out of switching operations at a very high frequency. If the regulating element is a solenoid-operated valve, the desired metered quantity of material cannot pass the valve within such short intervals of time.

OBJECTS AND SUMMARY OF THE INVENTION

Accordingly, it is an object of the invention to provide a regulating apparatus of the aforedescribed character which can function with a smaller number of switching operations and offers the possibility of varying the quantity of the additive to be admitted within a range which is wider than heretofore.

In accordance with the invention, this object is accomplished in that the control signal generator comprises a constant-frequency first timing pulse generator and a first counter which receives timing pulses from the first timing pulse generator and transmits a first counter overflow signal after receiving a predetermined number of first timing pulses, in that the control signal generator further comprises a second timing pulse generator whose frequency increases with decreasing departure from the norm and which transmits second timing pulses to a second counter which latter transmits a second counter overflow signal after receiving a predetermined number of second timing pulses, and in that the control signal generator also comprises a circuit which logically interconnects the first and second counter overflow signals in such a way that the first counter determines the duration of the periods and the second counter determines the width of the control signals within the periods.

In view of such construction, the frequency of the control signals is constant but their width is variable. The first counter can be adjusted for selecting a relatively long duration of the period, for example, in the range of 30 seconds or even within the range of minutes, because the second counter renders it possible to select the width of control signals within such period practically at will, i.e., as large or as small a width as desired. The period can be considerably longer than that which could be accurately determined with the aforediscussed conventional capacitor discharge circuit. The number of switching operations is reduced considerably. At any rate of the period, the width of the control signals can be sufficient to ensure that the entire metered quantity of additive can invariably flow through a solenoid-operated valve. The range within which the quantity of additive can be varied per unit of time can be readily increased to a multiple of the heretofore achievable range.

The start of the counting by both counters is preferably synchronized. This ensures that a single signal suffices to set the counters in operation. Such synchronization can be achieved in a particularly simple manner by connecting the output of the first counter directly to the resetting input of the second counter.

In accordance with a presently preferred embodiment, the second counter is connected with a holding circuit which maintains the second counter overflow signal until the expiration of the period whose duration is determined by the first counter. The holding circuit ensures that the signal of the second counter remains until the onset of the resetting step which initiates a new counter period. Such counter signal can be used as an output signal, either directly or after inversion.

Another possibility consists in that the control signals are furnished by the output of a flip-flop the first input of which receives a first input signal which is a function of the first counter overflow signal and the second input of which receives an input signal which is a function of the second counter overflow signal.

It is further advantageous if the first counter constitutes a voltage divider and is associated with a resetting circuit which obtains the resetting signal from the logic AND output of the first counter overflow signal and a signal with a smaller dividing ratio than that of the first counter overflow signal.

In this manner, it is possible to reset the first counter soon after the generation of the first counter overflow signal. Since the second divider-heating period is largely suppressed, the second counter (which is influenced by the first counter) can be maintained effective practically during the entire counting period of the first counter. This means that the width of the control signals can extend through the entire period of such control signal.

It is particularly advantageous if the second timing pulse generator comprises a comparator whose output transmits second timing pulses, one input of which receives a control voltage which corresponds to the extent of departure from the norm, and the other input of which receives voltage from the capacitor which can be charged by way of a resistance and can discharge by way of a switch which is controlled by timing pulses applied at an output of the comparator via resistor means to a control gate. By utilizing the first part of the characteristic curve of the voltage across the capacitor, a simple way is provided to insure that the width of the control signal varies proportionally with control voltage as a function of time.

A particularly high accuracy can be achieved if the charging voltage of the capacitor is stabilized by a Zener diode.

If the switch is a semiconductor switch, it is advisable to provide a diode bias voltage circuit to compensate for the voltage drop of the semiconductor switch. In this manner, one ensures that the capacitor is discharged to zero each time.

The novel features which are considered as characteristic of the invention are set forth in particular in the appended claims. The improved regulating apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
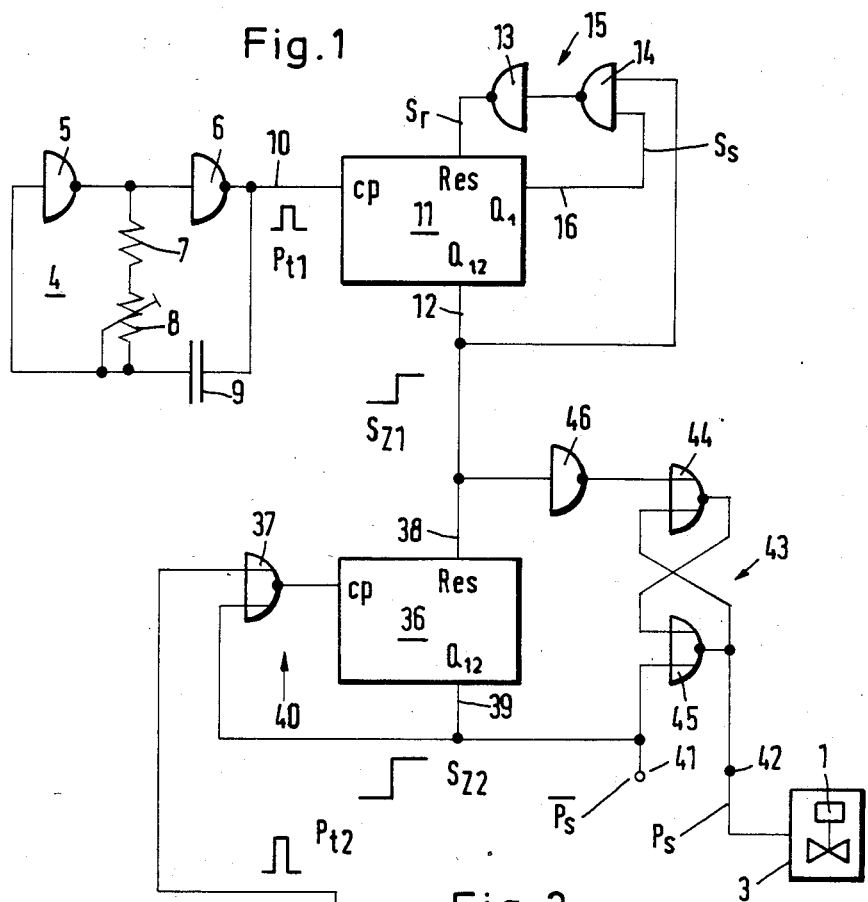
FIG. 1 is a schematic circuit diagram of a regulating apparatus which embodies the present invention.
Figure 2:
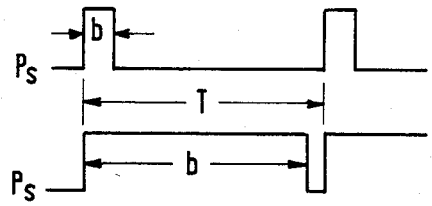
FIG. 2 represents a series of control signals of small width.
Figure 3:
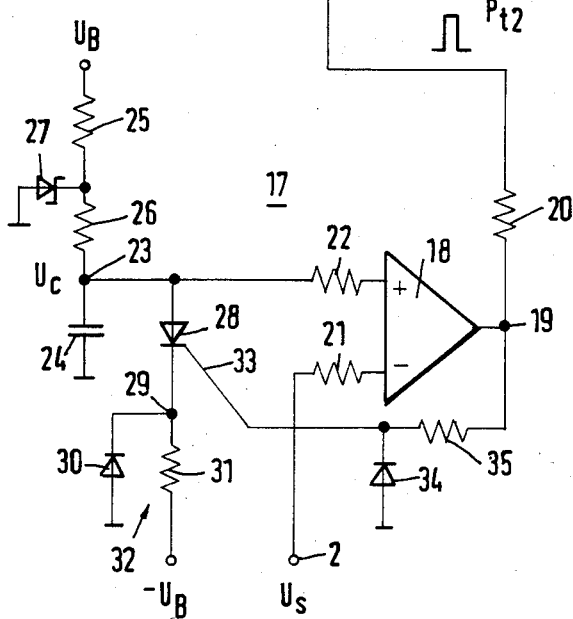
FIG. 3 represents a series of control signals having a greater width.

The regulating apparatus of FIG. 1 serves to actuate a regulating element 1 in the form of a solenoid-operated valve which admits into a medium an additive in order to maintain a certain parameter of the medium (e.g., the pH value) at a predetermined level. For example, one can deal with neutralizing of waste water, with selection of pH values in connection with neutralizing of water or, in the case of a Redox reaction, with desalinizing or a like procedure. The solenoid-operated valve 1 may be used for admission of relatively large quantities of additive. The departure of desired value from the actual value of the selected parameter is reflected by the characteristics of the input signal Us which is applied to the terminal 2 of the regulating apparatus and which is a voltage signal. The regulating element 1 constitutes a component part of a circuit 3 which receives control signals Ps in dependency on the extent of departure from the norm. As shown in FIGS. 2 and 3, the control signals Ps have a constant period T but a variable width b. FIG. 2 shows control signals Ps of the type generated when the departure from the norm is small, and FIG. 3 shows control signals Ps which are generated when the departure from the norm is pronounced.

It will further be noted that the width b represents an interval that occurs within the time frame of the constant period T. Thus, the time frame of the constant period T is a function of the frequency of the pulse generator 4 while the interval b is a function of the deviation from the norm, as represented by the value of the signal Us, the width or duration of the interval b being inversely proportional to the deviation from the norm.

The control signal generator of the regulating apparatus comprises a first timing pulse generator 4 which is assembled of NAND gates 5 and 6, a fixed resistor 7, a variable resistor 8 and a capacitor 9. The output 10 transmits timing pulses Pt1 whose frequency is a function of the values of the RC network and is variable, within limits, by varying the resistance of variable resistor 8.

These first timing pulses Pt1 are transmitted to the cp input of a first counter 11 which is connected so as constitute a divider. The output 12 of the counter 11 is located at the terminal Q12 which transmits a first counter overflow signal Sz1 after the input cp receives a predetermined number of pulses, for example, 2048 timing pulses, Pt1. The counter signal Sz1 is combined with a signal Ss which is transmitted by a second output 16 of the counter 11. The combining takes place in a logic AND connector 15 which includes two gates 13, 14. The frequency of the signal Ss is half the frequency of the timing pulse Pt1. This ensures the generation of a resetting signal Sr shortly after generation of the first overflow signal Sz1, and the signal Sr effects a resetting of the counter 11 to thereby start a new counting period. The counter period T (in the present example) includes the sum of 2048+1=2049 periods of timing pulses Pt1.

A second timing pulse generator 17 comprises a comparator 18 whose output 19 transmits second timing pulses Pt2 via resistor 20. The inverting input (−) of the comparator 19 receives the control potential Us via resistor 21. The non-inverting input (+) of the comparator 18 receives voltage Uc from a tap 23 via resistor 22. Uc represents the voltage at a capacitor 24 which is charged by the operating voltage $U_B$ by way of two series-connected resistors 25, 26. A Zener diode 27 is provided to ensure constant voltage at the series-connection of capacitor 24 and resistor 26. Discharging of the capacitor 24 takes place by way of a semiconductor switch 28 in the form of a controlled rectifier which is connected with a junction 29 of a diode bias voltage circuit 32 including a diode 30 and a resistor 31. By applying a negative bias voltage $-U_B$, the junction 29 is negatively biased to the extent which corresponds to the voltage drop at the diode 30 so that the voltage drop at the semiconductor switch 28 cannot interfere with complete discharge of the capacitor 24 to zero. The control conductor 33 connected to the gate of the semiconductor switch 28 is protected against excessive voltages by a diode 34 and is connected with the output 19 of the comparator 18 by resistor 35.

The operation is as follows:

When the voltage Uc rises as a result of charging of the capacitor 24 and eventually exceeds the control voltage Us, the potential at the output 19 of the comparator 18 assumes a positive value. This positive potential is applied to the gate of switch 28 via load 33 and renders the semiconductor switch 28 conductive, thereby providing a discharge path for capacitor 24. The potential at the output 19 of the comparator 18 then reassumes its initial value. The duration of these second timing pulses Pt2 is thus substantially or approximately proportional to the magnitude of control voltage Us.

The second counter 36 also constitutes a divider and its input cp receives the second timing pulses Pt2 by way of a NOR gate 37. The resetting input 38 of the counter 36 receives the first counter overflow signals Sz1. This means that the counting period begins at the very instant when the first counter 11 is reset and has started its counting operation because, at such instant, the first counter overflow signal Sz1 is zero. In accordance with the aforedescribed example, the output 39 of the second counter 36 also generates a second counter overflow signal Sz2 after its input cp receives 2048 second timing pulses Pt2. The second counter overflow signal Sz2 is applied to the input cp of the counter 36 via NOR gate 37 to thus form a hold circuit 40 for counter 36. Thus, the second counter signal Sz2 remains intact until a new counting interval begins as a result of resetting of the counter 36. Since the intervals between the second timing pulses Pt2 are proportional to the control voltage Us, the interval between generation of successive second counter signals Sz2 must also be proportional to such control voltage Us.

The two counter overflow signals Sz1 and Sz2 are interconnected in such a way that the output 41 of the circuit (the output 41 is connected directly with the output 39 of the second counter 36) can supply an inverted control signal $\overline{Ps}$ which, by proper design of the circuitry, can be used directly or after inversion.

In the present instance, the control signal Ps at the output 42 is obtained with assistance from a flip-flop 43 which comprises two NOR gates 44 and 45. The first input of the NOR gate 44 receives the first counter signal Sz1 by way of an inverter 46 and the first input of the NOR gate 45 directly receives the second counter signal Sz2. The second inputs of the gates 44, 45 are respectively connected with the outputs of the gates 45, 44 i.e., the second input of the gate 44 receives the signal at the output of the gate 45 and vice versa. In this manner, the flip-flop 43 assumes its set condition at the start of each period T which is determined by the counter 11 and is reset on generation of the second counter signal Sz2.

In a specific embodiment, the timing pulse frequency of the first timing pulse generator 4 was selected in such a way that, by appropriate selection of the capacitor 9 and adjustment of the value of the resistance network by adjustment of the variable resistor 8, the duration of the period T was 30 seconds. Other useful values are between 50 and 150 seconds and more. The values of the capacitor 24 and of the resistor 26 were selected in such a way that, in dependency on the control voltage Us, the width b of the control signals Ps was between one second and nearly 30 seconds. In dependency on the intended use, the lower limit can be lowered still further. The upper limit of the width b can be no greater than the duration of the periods T.

For example, the counters 11 and 36 may be of the type CD 4040. The NOR gates 37, 44 and 45, as well as the inverter 46 can be assembled into a module of the type CD 4001, and the NAND gates 5, 6, 13 and 14 can be assembled into a second module of the type CD 4011.

In varying or adjusting the period T, it is not necessary to wait out the entire counter period of the counter 11. It suffices to adjust the frequency of the timing pulse generator 4 to a value corresponding to that of the period T.

A preferred embodiment of the invention has been shown and described along with potential uses of the invention. Changes in circuitry from that described herein and other modifications may be made, as will be apparent to those skilled in the art, without departing from the invention, as defined in the claims.

Wherefore, we claim:

1. Apparatus for regulating a parameter which at times deviates from a predetermined norm by admitting an additive to a medium, comprising a control signal generator for generating a control signal which is dependent on the departure from said norm and a regulating element which effects the admission of additive for the duration of the control signal, said control signal generator comprising a first timing pulse generator having a constant frequency, a first counter having an input for receiving timing pulses from the first timing pulse generator and an output for generating and transmitting a first counter overflow signal after elapse of a predetermined period during which said input receives a predetermined number of timing pulses, a second timing pulse generator the frequency of which is inversely proportional to said norm, and a second counter having an input for receiving timing pulses from said second timing pulse generator and an output for generating and transmitting a second counter overflow signal after receiving a predetermined number of second timing pulses, said first and second counters being arranged to start counting the signals which are transmitted to their respective inputs in synchronism with one another and said second counter further having a resetting input connected to the output of said first counter, and said control signal generator further comprising a circuit which logically interconnects the first and second counter overflow signals in such a way that the first counter determines the frequency and a time frame in which said additive is added and the second counter determines the duration, within said time frame, for which the additive is added.

2. Apparatus according to claim 1, further comprising a flip-flop having an output arranged to transmit to said regulating element control signals, a first input for receiving a first input signal which is a function of said first counter overflow signals and a second input for receiving a second input signal which is a function of said second counter overflow signals.

3. Apparatus for controlling actuation of a control valve for admitting an additive into a medium in inverse proportion to deviation from the norm of said medium, said apparatus including:

a first pulse generator for generating first pulses at a predetermined constant rate;

a first counter for counting said first pulses applied by said first pulse generator and for providing a first overflow output signal in response to having counted a predetermined number of pulses;

a second pulse generator for generating second pulses at a rate inversely proportional to the deviation from said norm of said medium;

a second counter for counting said second pulses applied by said second pulse generator and for providing a second overflow output signal in response to having counted a predetermined number of pulses;

said second pulse generator including an RC timing network connected between a constant voltage and a return for charging the capacitor of said RC network, an input corresponding to said deviation of said norm, a comparator for comparing the relationship between the potential applied to said comparator from said capacitor and the potential applied to said comparator from said input corresponding to said deviation and for providing a second pulse when the potential applied from said capacitor overcomes the potential applied from said input, a discharge path for said capacitor, controllable switch means in said discharge path, means for coupling said second pulse output to said switch means for turning on said switch means for discharging said capacitor so that the frequency of said second pulse is inversely proportional to the potential of said input;

means for coupling said first overflow output signal to the reset of said second counter and to the reset of said first counter for starting both counters in unison; and means for applying said second overflow output signal to said control valve for operating said control valve in inverse proportion to said deviation.

4. Apparatus for controlling actuation of a control valve as in claim 3 and in which said first counter and said second counter both count the same number of input pulses before putting out their respective overflow signals.

5. Apparatus for regulating a parameter which at times deviates from a predetermined norm by admitting an additive to a medium, comprising a control signal generator for generating a control signal which is dependent on the departure from said norm and a regulating element which effects the admission of additive for the duration of the control signal, said control signal generator comprising a first timing pulse generator having a constant frequency, a first counter having an input for receiving timing pulses from the first timing pulse generator and an output for generating and transmitting a first counter overflow signal after elapse of a predetermined period during which said input receives a predetermined number of timing pulses, a second timing pulses generator the frequency of which is inversely proportional to said norm, and a second counter having an input for receiving timing pulses from said second timing pulse generator and an output for generating and transmitting a second counter overflow signal after receiving a predetermined number of second timing pulses, said control signal generator further comprising a circuit which logically interconnects the first and second counter overflow signals in such a way that the first counter determines the frequency and the time frame in which said additive is added and the second counter determines the duration, within said time frame, for which the additive is added, and a holding circuit associated with said second counter to maintain the second counter overflow signal no longer that said predetermined period.

6. Apparatus according to claim 5, further comprising a NOR gate having a first input connected with the output of said second counter, a second input connected with the second timing pulse generator and an output connected to the input of said second counter.

7. Apparatus for regulating a parameter which at times deviates from a predetermined norm by admitting an additive to a medium, comprising a control signal generator for generating a control signal which is dependent on the departure from said norm and a regulating element which effects the admission of additive for the duration of the control signal, said control signal generator comprising a first timing pulse generator having a constant frequency, a first counter having an input for receiving timing pulses from the first timing pulse generator and an output for generating and transmitting a first counter overflow signal after elapse of a predetermined period during which said input receives a predetermined number of timing pulses, said counter constituting a voltage divider and including a resetting circuit and said control signal generator further comprising a logic AND circuit having a first input connected with the output of said first counter and a second input, said first counter having a second output arranged to transmit to the second input of said logic AND circuit a signal with a divider ratio smaller than that of said counter overflow signal, said logic AND circuit further having an output arranged to transmit resetting signals to the resetting circuit of said first counter and said control signal generator further comprising a second timing pulse generator the frequency of which is inversely proportional to said norm, a second counter having an input for receiving timing pulses from said second timing pulse generator and an output for generating and transmitting a second counter overflow signal after receiving a predetermined number of second timing pulses, and a circuit which logically interconnected the first and second counter overflow signals in such a way that the first counter determines a frequency and a time frame in which said additive is added and the second counter determines the duration, within said time frame, for which the additive is added.

8. Apparatus for regulating a parameter which at times deviates from a predetermined norm by admitting an additive to a medium, comprising a control signal generator for generating a control signal which is dependent on the departure from said norm and a regulating element which effects the admission of additive for the duration of the control signal, said control signal generator comprising a first timing pulse generator having a constant frequency, a first counter having an input for receiving timing pulses from the first timing pulse generator and an output for generating and transmitting a first counter overflow signal after elapse of a predetermined period during which said input receives a predetermined number of timing pulses, a second timing pulse generator the frequency of which is inversely proportional to said norm and which comprises a comparator having first and second inputs and an output arranged to apply timing pulses, means for applying a control voltage to the first input of said comparator, capacitor means for applying to the second input of said comparator a control voltage corresponding to the extent of departure from said norm, resistor means for charging said capacitor means, a Zener diode for stabilizing the charging voltage of said capacitor means, switch means for discharging said capacitor means in response to timing pulses from the output of said comparator, a second counter having an input for receiving timing pulses from the output of said comparator and an output for generating and transmitting a second counter overflow signal after receiving a predetermined number of second timing pulses, and a circuit which logically interconnects the first and second counter overflow signals in such a way that the first counter determines the frequency and the time frame in which said additive is added and the second counter determines the duration, within said time frame, for which the additive is added.

9. Apparatus according to claim 8, wherein said switch constitutes a semiconductor switch and further comprising a diode bias voltage circuit to compensate for the voltage drop of the semiconductor switch.

* * * * *